United States Patent Office 3,489,811
Patented Jan. 13, 1970

3,489,811
PROCESS FOR PRODUCING ODORLESS ORGANIC PHOSPHINES
Arnold Drucker, Stamford, and Martin Grayson, Norwalk, Conn., assignors to American Cyanamid Company, Stamford, Conn., a corporation of Maine
No Drawing. Filed July 27, 1967, Ser. No. 656,336
Int. Cl. C07f 9/02; C07d 105/02; A61k 7/10
U.S. Cl. 260—606.5         12 Claims

ABSTRACT OF THE DISCLOSURE

A process for producing substantially odor-free organic tertiary phosphines by reacting a phosphine compound, such as $PH_3$, with a mono-olefinic compound, for example, allyl alcohol, in the presence of a free radical initiator, and then further reacting the tertiary phosphine reaction product with mono-olefinic compound in the presence of additional free radical initiator to produce an odorless, tertiary phosphine composition. Free radical catalysts such as azobisisobutyronitrile are preferred free radical initiators. The said organic tertiary phosphines are suitable for cosmetic usages, such as for use in hair waving compositions.

---

This invention relates to the production of phosphines, and more particularly, to the preparation of odor-free tertiary phosphines.

Organic phosphine compounds have heretofore been put to a wide variety of uses. For example, Patent 3,256,154 to Jenkins et al. teaches the use of tris(hydroxymethyl)phosphine in hair waving. It has recently been discovered that certain water-soluble tertiary phosphines of the formula:

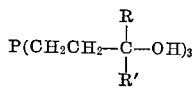

where each of R and R' is a hydrogen or methyl group, provide greatly and unexpectedly improved results when used in hair waving compositions. Our co-pending application, Ser. No. 652,734, filed July 12, 1967, relates to the use of such compositions in hair waving.

Other types of phosphine compounds are used for various purposes other than hair waving, such as in gasoline additives and sequestrants for metals.

Numerous processes have been proposed for the preparation of organic phosphine compounds. Such processes include, for example, reacting a phosphorous trihalide with an alkyl magnesium halide; and reacting the sodium salt of a hydrocarbon-substituted phosphine with an organic halide in liquid ammonia. These and other prior art methods of phosphine production, and the shortcomings of each, are discussed in U.S. Patent 2,803,597 to Stiles et al.

The Stiles et al. patent proposes still another procedure for the preparation of organic phosphines, which comprises reacting a phosphine compound with an unsaturated aliphatic compound in the presence of a free radical initiator. This process overcomes many of the shortcomings of the prior art in providing an economically feasible process for large scale production of organic phosphines.

Unfortunately, however, the Stiles et al. process also suffers from certain shortcomings, in that the phosphine products produced by that process are undesirably malodorous having an unpleasant "fish-like" odor. This odor problem is particularly acute in the production of phosphine compounds for cosmetic usages, such as for use in hair waving compositions.

It is believed that this obnoxious "fish-like" odor is due to the presence of small amounts of impurities in the phosphine compounds. Various conventional techniques, such as vacuum stripping, steam distillation, chromatography, boiling with adsorbent charcoal, and the like have been used in attempts to remove these odoriferous impurities. All such techniques have been heretofore unsuccessful.

Purification of the phosphine compounds by vacuum distillation and similar techniques requires the use of temperatures in excess of 225° C. at reduced pressures of about 0.1 to 1.0 mm., and such harsh distillation procedures are generally accompanied by extensive decomposition of the phosphine products. Such decomposition, of course, reduces yields of the desired phosphine products.

Accordingly, it is a primary object of the present invention to provide an improved process for the production of organic tertiary phosphine compounds which are substantially odor-free and thus are suitable for use in cosmetics and other products where consumer acceptance may be adversely affected by unpleasant odors in such compositions.

Another object of the present invention is to provide an improved process for the preparation of odor-free tertiary phosphines in which the phosphines can be economically produced on a large scale basis.

Yet another object of the present invention is to provide a process for preparing and purifying organic tertiary phosphines to remove malodorous impurities from such phosphine compositions, and thereby to produce a substantially odorless tertiary phosphine product.

A further specific object of one embodiment of the present invention is to provide a process for the production of an odor-free tris(hydroxypropyl)phosphine which is suitable for use in hair waving, and achieves excellent waving efficiency while avoiding the unpleasant odor of prior art phosphine products.

Additional objects and advantages of the invention will be set forth in part in the description which follows, and in part will be obvious from the description, or may be learned by practice of the invention, the objects and advantages being realized and attained by means of the methods, processes, and improvements particularly pointed out in the appended claims.

To achieve the foregoing objects and in accordance with its purpose, as embodied and broadly described, the present invention provides an improved process for the preparation of substantially odor-free tertiary phosphines, which comprises reacting a phosphine compound having at least one hydrogen atom directly bound to the trivalent phosphorous atom with a mono-olefinic compound in the presence of a free radical initiator, to produce a reaction product which substantially comprises a water-soluble, organic, tertiary phosphine; and then further reacting this reaction product with additional mono-olefinic compound, again in the presence of a free radical initiator, to produce a substantially odorless tertiary phosphine composition.

The invention consists in the novel methods, processes, steps and improvements shown and described. It is to be understood that both the foregoing general description and the following detailed description are exemplary and explanatory but are not restrictive of the invention.

The present process involves the reaction of a phosphine compound with a mono-olefinic compound. The phosphine compounds which can be used in this reaction are compounds of the formula:

(1)

where $R_1$ and $R_2$ each represent either a hydrogen atom or a saturated organic radical which is bound to the phosphorous atom by a carbon-to-phosphorous bond. Thus the phosphine compounds used in the process of this invention are saturated phosphines having at least one hydrogen atom directly bound to the trivalent phosphorous atom. Suitable phosphine compounds include phosphine ($PH_3$), ethyl phosphine, dibutyl phosphine, cyclohexyl phosphine, 3-chloropropyl phosphine, dodecyl phosphine, phenyl phosphine, hydroxymethyl phospine, 3-hydroxypropyl phosphine, bis(3-hydroxypropyl)phosphine, 3 - hydroxybutylphosphine, bis(3 - hydroxybutyl) phosphine and the like.

It can be seen from the above recitation of suitable phosphine compounds for use in the present process that the "R" radical of the $HPR_2$ compound of Formula I comprise an alkyl group containing 1 to 18 carbon atoms; similar alkyl groups substituted with hydroxy groups or halogen groups, such as chlorine or bromine groups or the like; or aryl radicals. In accordance with a preferred embodiment of this invention, both R radicals of the phosphine compound of Formula I are hydrogen, and the phosphine compound used in the present process is phosphine ($PH_3$).

The mono-olefinic reactant used in the present process can be any unsaturated aliphatic organic compound having one carbon-to-carbon double bond. Such compounds as ethylene, propylene, 2-butene, isobutene, cyclohexene, acrylonitrile, methacrylonitrile, vinyl acetate, vinylpyridine, vinylimidazole, methyl vinyl ketone, styrene, methacrylic acid, dimethylaminoethyl methacrylate, methyl acrylate, methyl methacrylate, and the like can be satisfactorily reacted with a phosphine compound in accordance with the present process. Advantageously, the mono-olefinic compound used in this process is an unsaturated alcohol, amine or amide having the formula:

$$R-Z$$

where R is an olefinic group containing 1 to 5 carbon atoms and Z is an —OH, —$NH_2$, or —$CONH_2$ group. Exemplary of such compounds are allyl alcohol, 3-butene-2-ol, 3-butene-2-methyl-2-ol, allyl amine, 1-amino-3-butene, acrylamide, 3-butenamide, methacrylamide, and the like.

As pointed out above, the odorless products of the process of this invention are particularly desirable for use in cosmetic products, such as in hair waving creams or lotions. For this reason a particularly prefered group of odorless phosphine compositions produced by this process comprises tris(3 - hydroxypropyl)phosphine, tris(3-hydroxybutyl)phosphine, and tris(3 - hydroxytertpentyl) phosphine. These preferred compounds are produced in accordance with the present process using as reactants phosphine ($PH_3$) and an unsaturated alcohol having the formula:

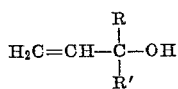

where each of R and R' is a hydrogen or methyl group. In its most preferred form, the present process is used in the production of odor-free tris(3 - hydroxypropyl) phosphine by the reaction of phosphine ($PH_3$) and allyl alcohol.

In accordance with the present process the phosphine compound and the mono-olefinic compound are reacted in the presence of a free radical initiator to produce a tertiary phosphine. Exemplary of such free radical initiators are benzoyl peroxide, sodium persulfate, di-tert-butyl peroxide, and various other peroxide, percarbonate, persulphate, and similar per-salts and redox catalysts, such as sodium chlorate/sodium bisulfite, sodium persulfate/sodium bisulfite, etc. Azo compounds are also excellent free radical initiators, and various azo and diazo free radical catalysts can be used in the present process. Azobisisobutyronitrile (AIBN) catalysts have been found to produce optimum results in the present process. In accordance with the present invention the phosphine reactant is mixed with the mono-olefinic compound in the presence of a free radical initiator to produce a reaction product which substantially comprises a water-soluble, organic, tertiary phosphine. This reaction product, however, generally possesses a persistent, obnoxious, fish-like odor.

In order to eliminate this undesirable odor and to produce a substantially odorless tertiary phosphine composition, the reaction product of the foregoing reaction is further reacted with an additional mono-olefinic compound, again in the presence of a free radical initiator. It has been found that this two-stage (or multi-stage) reaction eliminates the undesirable odor normally present in such phosphine reaction products and achieves the desired, substantially odorless, phosphine composition.

Although applicants do not wish to be bound to any particular theory for the successful operation of the present process, it is believed that the obnoxious, fish-like odor of the tertiary phosphine reaction product of the first stage of the process is due to the presence of minor amounts of mono- and bis-substituted phosphines in the substantially tertiary phosphine first-stage reaction product. These compounds, such as, for example, mono- and bis-(3-hydroxypropyl)phosphines, are malodorous compounds which can not be completely removed from the desired tertiary phosphine reaction product by conventional purification techniques.

It is believed that the further reaction in the second and succeeding stages of the present process eliminates the phosphine odor of the initial reaction product by upgrading these mono- and bis-substituted phosphines to the tertiary stage, thereby essentially eliminating the undesirable odor of the composition and producing tertiary phosphine products of sufficient quality for use in cosmetic materials.

Although it is possible to utilize a different mono-olefinic compound, and a different free radical initiator in each stage of the present process, there is normally no reason to change reactants, and the same free radical initiator and mono-olefinic compound are preferably used in each stage of the process.

The multi-stage reactions of the present process can be carried out in various ways. Thus, additional mono-olefinic compound can be added to the first stage reaction product of the present process, again in the presence of a free radical initiator, and a second reaction initiated. If the second stage of the present process is carried out in this fashion, it is generally preferred to purify the tertiary phosphine reaction product of the first stage of the process before the further reaction of the second stage of the process is carried out.

For example, conventional distillation or vacuum stripping techniques can be utilized to remove excess of mono-olefinic reactant and other volatile impurities from the reaction product prior to the initiation of the second stage of the process. The purified reaction product is then mixed with a fresh supply of mono-olefinic compound and a suitable free radical initiator and the second stage reaction is initiated.

In another, and the presently preferred, method of practicing the present process, the phosphine reactant is mixed with an excess of mono-olefinic compound and the free radical catalyst is added to this mixture in at least two stages, with the reaction being allowed to go to completion following each catalyst addition. In this manner, the theoretical reaction necessary to produce the desired tertiary phosphine composition is effected on the first addition of the free radical initiator. The second and subsequent additions effect the desired upgrading of the mono- and bis-substituted phosphine impurities and thereby eliminate the undesirable odor from the final tertiary phosphine composition.

It is particularly preferred to carry out this multi-stage reaction in five stages. For example, an azobis-isobutyronitrile free radical catalyst can be added to a reaction mixture comprising phosphine ($PH_3$) and an excess of allyl alcohol in five stages, with about an equal amount of catalyst being added to the mixture in each of these stages. The reaction is allowed to go to completion following each of these additions, and this process produces an essentially odor-free tris(3-hydroxypropyl)phosphine which is satisfactory for use in cosmetics, such as hair waving lotions and the like.

The multi-stage addition of free-radical catalyst, to a mixture comprising excess mono-olefinic compound and the phosphine compound is readily adaptable to large scale commercial operations and is the presently preferred manner of carrying out the process of this invention.

All of the reaction stages of the present process are substantially independent of temperature and can be carried out at any temperature at which the phosphine compound and the mono-olefinic compound react to produce the desired tertiary phosphine. Thus, the only temperature requirement is that a sufficiently high temperature be used to generate free radicals from the particular free radical catalyst selected. Generally, temperatures of from about 40° C. to 120° C. can be used in all stages of the present process, with temperatures of about 80° C. being preferred. The completion of the first stage of the reaction is generally indicated by the occurrence of an exotherm and its subsequent gradual subsidence.

The amount of free radical catalyst utilized in each stage of the present process can be varied widely but will generally comprise about 0.1 to 3 percent of the total weight of the phosphine and mono-olefinic reactants.

The various reaction stages of the present process can be carried out in either batch or continuous form, with the reactants in either the liquid or the vapor phase. The reactions can be carried out in an inert solvent or diluent medium, if desired. Suitable diluents for use in the present process include ethanol and other lower alkyl saturated alcohols; liquid hydrocarbons such as pentane, benzene, and the like; saturated esters such as butyl acetate; saturated ethers such as dioxane; and the like.

Since the present process is designed for the production of tertiary phosphines, the phosphine and monoolefinic compound are contacted in suitable proportions, i.e., stoichiometric or preferably greater ratio of mono-olefinic compound to phosphine to achieve the production of such compositions.

For a clearer understanding of the invention, specific examples of it are set forth below. These examples are merely illustrative and are not to be understood as limiting the scope and underlying principles of the invention in any way. All parts and percentages referred to herein are by weight unless otherwise specifically indicated.

EXAMPLE 1

A stainless steel autoclave is charged with 61 grams of phosphine ($PH_3$), 580 grams of reagent grade allyl alcohol, and 5 grams of azobisisobutyronitrile. The reaction mixture is heated at 80° C. for four hours, at which time the autogenous pressure has diminished from a maximum of 200 p.s.i.g. to 10 p.s.i.g. When the reaction temperature initially reaches 50 to 55° C. an exotherm occurs to 96° C and gradually subsides The clear solution containing the reaction product is removed from the autoclave and placed in a glass distillation flask where the excess allyl alcohol is removed by distillation at a reduced pressure of about 5 mm. Hg. The residual clear oil weighs 351 grams (93.5% conversion). It has a persistent, bad, fish-like odor. Samples of this product are treated for extended periods by heating under vacuum conditions, and by small scale flash distillation, but the characteristic phosphine odor is not eliminated.

A 250 ml. 3-neck flask is charged with 20 grams of the oily product of the reaction described above, 10 grams of allyl alcohol, 50 ml. of absolute ethanol, and 0.4 gram of azobisisobutyronitrile. The mixture is heated for four hours at 80° C., and the ethanol and excess allyl alcohol are then removed by distillation at a reduced pressure of about 5 mm. Hg. The residue is a clear oily liquid which is essentially odorless and which is shown by analysis to be tris(3-hydroxypropyl)phosphine. Analysis of this composition shows it to contain 93% active phosphine.

The phosphine analyses of this example are carried out by reaction of the product being tested with iodine and back-titration with thiosulphate. All of the reactions of this example are carried out under a nitrogen atmosphere.

The tris(3-hydroxypropyl)phosphine produced in this example achieves excellent efficiency in the waving of human hair, both at alkaline and at near neutral pH's.

EXAMPLE 2

The procedure of Example 1 is repeated in this example, except that the mono-olefinic compound used in this example is 650 grams of 3-butene-2-ol. The results achieved in this example are substantially similar to those of Example 1.

EXAMPLE 3

The procedure of Example 1 is repeated in this example, except that the mono-olefinic compound used in this example is 700 grams of 3-butene-2-methyl-2-ol. The results achieved in this example are substantially similar to those of Example 1.

EXAMPLE 4

A stainless steel autoclave is charged with 870 grams of reagent grade allyl alcohol and 92 grams of phosphine. Seven (7) grams of AIBN catalyst diluted to 150 ml. with allyl alcohol is prepared, and 30 ml. of this solution are charged to the autoclave. The reaction mixture is then heated, and when it reaches 60° C. an exotherm to 132° occurs and gradually subsides. The reaction mixture is then heated at 80° C. for one additional hour, and an additional 30 ml. of the AIBN solution is added to it. Heating at 80° C. is continued without any further exotherm. Three (3) more 30 ml. portions of AIBN solution are added to the reaction mixture at one hour intervals, with the reaction mixture continuing to be heated at 80° C. throughout and between these additions and for five hours after the final addition.

The final reaction mixture is then transferred under nitrogen from the autoclave to a glass flask, and the excess allyl alcohol is removed by distillation under a reduced pressure of about 5 mm. Hg. The oily residue, which has a pale yellow color, is then heated with nitrogen purging under vacuum conditions at 80° C. for four hours. The product is an essentially odorless liquid which analysis shows to be tris(3-hydroxypropyl)phosphine.

EXAMPLE 5

The procedure of Example 4 is repeated in this example, except that the mono-olefinic compound initially charged to the autoclave is 950 grams of 3-butene-2-ol and the AIBN catalyst is diluted to 150 ml. with the same olefinic compound. The results achieved are substantially similar to those of Example 4.

EXAMPLE 6

The procedure of Example 4 is repated in this example, except that the phosphine compound used in this example is 1100 grams of 3-butene-2-methyl-2-ol. The results achieved in this example are substantially similar to those of Example 4.

EXAMPLE 7

The procedure of Example 4 is duplicated in this example, except that the catalyst solution used in this example is 7 grams of di-tert-butyl peroxide diluted to 150 ml. with allyl alcohol instead of the AIBN catalyst system used in Example 4. The procedure of this example produces a tris(3-hydroxypropyl)phosphine in a satisfactory yield and of a lower color level than that of Example 4. Qualitative comparison by observers indicates a slightly higher odor level in the product of this example than that present in the product of Example 4. The odor is reduced to a more satisfactory level by carrying out the final four hour vacuum stripping procedure at temperatures between 90 and 120° C. rather than the 80° C. used in Example 4.

The invention in its broader aspects is not limited to the specific details shown and described, but departures may be made from such details within the scope of the accompanying claims without departing from the principles of the invention and without sacrificing its chief advantages.

We claim:
1. A process for the production of a substantially odor-free tertiary phosphine which comprises:
   (a) reacting a phosphine compound having at least one hydrogen atom directly bound to its trivalent phosphorous atom with a mono-olefinic compound, in the presence of a free radical initiator and until occurrence and subsidence of an exotherm, to produce a reaction product which substantially comprises a water-soluble, organic, tertiary phosphine; and
   (b) then further reacting said reaction product with mono-olefinic compound, again in the presence of additional free radical initiator, to produce a substantially odorless tertiary phosphine composition.
2. The process of claim 1 in which the mono-olefinic compound used in both reactions is an unsaturated alcohol, amine, or amide having the formula:

$$R-Z$$

where R is an olefinic group containing 1 to 5 carbon atoms and Z is an —OH, —NH$_2$, or —CONH$_2$ group.
3. The process of claim 1 in which the phosphine compound is phosphine (PH$_3$).
4. The process of claim 3 in which the mono-olefinic compound is an unsaturated alcohol having the formula:

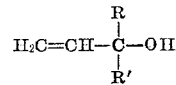

where each of R and R' is a hydrogen or methyl group.
5. The process of claim 4 where the mono-olefinic compound is allyl alcohol and the substantially odorless tertiary phosphine composition is tris(3-hydroxypropyl)phosphine.
6. The process of claim 5 in which the free-radical initiator is a free-radical catalyst which comprises azobisisobutyronitrile.
7. The process of claim 1 in which the free-radical initiator is a free-radical catalyst which decomposes on heating to yield free radicals.
8. The process of claim 7 in which the free-radical catalyst is azobisisobutyronitrile.
9. The process of claim 1 in which phosphine (PH$_3$) is mixed with an excess of the mono-olefinic compound and the free-radical initiator is added to said mixture in at least two stages with the reaction being allowed to go to completion following each addition of free-radical initiator.
10. The process of claim 9 in which said monoolefinic compound is allyl alcohol and said odorless tertiary phosphine composition comprises tris(3-hydroxypropyl)phosphine.
11. The process of claim 10 in which the free-radical initiator is azobisisobutyronitrile.
12. The process of claim 11 in which the azobisisobutyronitrile free-radical catalyst is added to the allyl alcohol-phosphine mixture in five stages, with about an equal amount of said catalyst being added in each of said stages and with the reaction being allowed to go to completion following each of said additions.

References Cited

UNITED STATES PATENTS 2,803,597   8/1957   Stiles et al. _____ 260—606.5 X

OTHER REFERENCES

Cotton: Progress In Inorganic Chemistry (1963), Vol. 5, pp. 180–1, QD 151 p. 7.

DELBERT E. GANTZ, Primary Examiner

W. F. W. BELLAMY, Assistant Examiner

U.S. Cl. X.R.

424—217, 211